United States Patent [19]

Usui et al.

[11] Patent Number: 4,896,236
[45] Date of Patent: Jan. 23, 1990

[54] TAPE STABILIZER UNIT FOR STABILIZING A MOVING TAPE IN A TAPE RECORDING AND/OR REPRODUCING APPARATUS

[75] Inventors: Hayao Usui; Satoshi Mogi, both of Kanagawa, Japan

[73] Assignee: Sony Corporation, Tokyo, Japan

[21] Appl. No.: 218,226

[22] Filed: Jul. 13, 1988

[30] Foreign Application Priority Data

Jul. 15, 1987 [JP] Japan .................................. 62-176586

[51] Int. Cl.⁴ ...................... G11B 15/61; G11B 15/66; G11B 15/60
[52] U.S. Cl. .................. 360/130.23; 360/85; 242/23; 242/195
[58] Field of Search .......... 360/85, 90, 130.21–130.23, 360/84; 242/23, 195

[56] References Cited

U.S. PATENT DOCUMENTS 4,739,421 4/1988 Narasawa ..................... 360/130.22

FOREIGN PATENT DOCUMENTS

61-233452 10/1986 Japan ............................. 360/130.21

Primary Examiner—Robert S. Tupper
Attorney, Agent, or Firm—Lewis H. Eslinger; Jay H. Maioli; Donald S. Dowden

[57] ABSTRACT

A stabilizer for a magnetic tape includes a roller, a weight, and a holder for supporting the weight. The stabilizer may be located within a small space in the vicinity of a rotary head drum provided in a VTR and attenuates longitudinal vibration of the magnetic tape just before the position at which the tape contacts the periphery of a rotary head drum mounted in a VTR. The roller has the weight on its upper end and is positioned so as to keep in contact with the tape so as to absorb longitudinal vibration thereof and thereby provide a high quality jitter free picture.

28 Claims, 6 Drawing Sheets

TAPE STABILIZER UNIT FOR STABILIZING A MOVING TAPE IN A TAPE RECORDING AND/OR REPRODUCING APPARATUS

BACKGROUND OF THE INVENTION

The present invention relates generally to a stabilizer for a magnetic recording and/or reproducing apparatus, such as a video tape recorder (VTR). More specifically, the invention relates to an improved structure of a stabilizer for damping vibration of the magnetic tape in a VTR.

In general, stability of magnetic tape travel motion in a VTR influences wow and flutter of reproducing audio signals and fluctuation of control signals causes jitter. To achieve the desired stability, some VTRs have an impedance roller for stabilizing the travel of the magnetic tape.

When a magnetic tape cassette is loaded into a conventional type VTR, a pivotal closure lid is automatically pivoted away from the front surface of the tape cassette to expose the magnetic tape, and a set of tape guide posts provided in the VTR guide the exposed tape onto a rotary head drum so as to be wrapped helically about at least a portion of the periphery of the drum. Another section of the tape between two of the guide posts is brought into engagement with a full width erase head.

During reproduction or recording, the tape is withdrawn from the supply reel table in the tape cassette and driven across the surfaces of the guide posts, the erase head and the drum. Longitudinal vibration of the tape tends to be generated at the points of contact between the tape and the erase head and guide post which causes jitter or fluctuation of the video signal, thereby producing a fluctuating picture. Particularly, when a improved magnetic tape having a high grade magnetic layer and a mirror surface film layer on a back surface thereof, such as a metal tape is used, the longitudinal vibrations of the tape tend to be much greater than with normal tape. The reason is that the tape section contacting the surface of the full width erase head and the guide posts located at the supply reel table side tends to stick. This is due to the relatively high friction coefficient of such tape. Thus, so-called "stick-slip" at contact surfaces generates longitudinal vibrations in the tape which induce jitter in the signal. It will be appreciated that reduction of the longitudinal vibration of the tape on the periphery of the rotary head drum is important in order to record or reproduce a high quality picture.

Therefore, while there is no very serious problem when a normal type magnetic tape is used in a conventional VTR, in order to obtain a high quality picture a VTR which is compatible with high quality tape comprising an effective means for attenuation of the longitudinal vibration of the tape generated at the erase head etc. located in the vicinity of the rotary head drum has been desired.

SUMMARY OF THE INVENTION

It is one object of the present invention to provide a tape stabilizer for effectively damping the longitudinal vibrations of a magnetic tape.

It is another object of the invention to provide an improved structure of a stabilizer mechanism which can be easily mounted in a small space in the vicinity of a rotary head drum in a VTR.

According to one aspect of the present invention, there is provided a tape stabilizer unit for a recording and/or reproducing apparatus comprising, a roller arranged so as to be in contact with the surface of the tape, the roller rotatable by engagement with the moving tape, a weight having a diameter larger than that of the roller, and means for detachably connecting said weight to said roller.

According to another aspect of the present invention, there is provided a stabilizer unit, for damping vibration of a magnetic tape in a recording and/or reproducing apparatus including a magnetic head, comprising a roller adapted to be disposed within a small space defined between the magnetic head and the tape path, the roller arranged so as to be in contact with the surface of the magnetic tape, and a weight provided on said roller, whereby the vibration of the tape is transmitted by the weight via the roller so as to be damped.

According to another aspect of the present invention, there is provided a stabilizer unit, for damping longitudinal vibration of a magnetic tape, provided on a mechanical chassis in a recording and/or reproducing apparatus including a magnetic rotary head drum, comprising a roller adapted to be located in a small in the vicinity of the rotary head drum, the roller being held in contact with the surface of the running magnetic tape, and means for providing a predetermined mass to the roller.

According to another aspect of the present invention, there is provided a stabilizer unit, for damping vibration of a magnetic tape, installed on a mechanical chassis on which a magnetic rotary head and guide posts including a height adjusting means for restricting the height of tape are arranged in a recording and/or reproducing apparatus including a magnetic head, comprising a roller provided in the vicinity of the rotary head drum, the roller being arranged so as to be in contact with the surface of the magnetic tape and rotating so as to follow the tape travel motion, and a weight provided on the roller, whereby the vibration of the tape is transmitted by the weight via the roller so as to be damped.

According to a further aspect of the present invention, there is provided an apparatus for recording and/or reproducing signals on a magnetic tape wound on supply and take-up reels in a cassette, comprising, a mechanical chassis, a magnetic head assembly, installed on said mechanical chassis, operative to magnetically record or reproduce signals on the tape, a loading mechanism, including a plurality of tape guide posts, for disposing the tape in a predetermined path leading out of the operatively positioned cassette, one of the guide posts being disposed in the vicinity of the magnetic head assembly, a driving mechanism for driving the tape from the supply reel to take-up reel via the magnetic head assembly, and a weight detachably provided on the one of said guide posts.

BRIEF DESCRIPTION OF THE DRAWINGS

The present invention will be understood from the detailed description given hereinbelow and from the accompanying drawings of the preferred embodiment of the invention but are for explanation and understanding only.

DESCRIPTION OF THE PREFERRED EMBODIMENT

In order to facilitate understanding of a stabilizer mechanism according to the present invention, before the description of an embodiment of the invention, function of the stabilizer mechanism for a magnetic tape, provided in a reproducing and/or recording apparatus will now be described hereinbelow.

Figure 1:
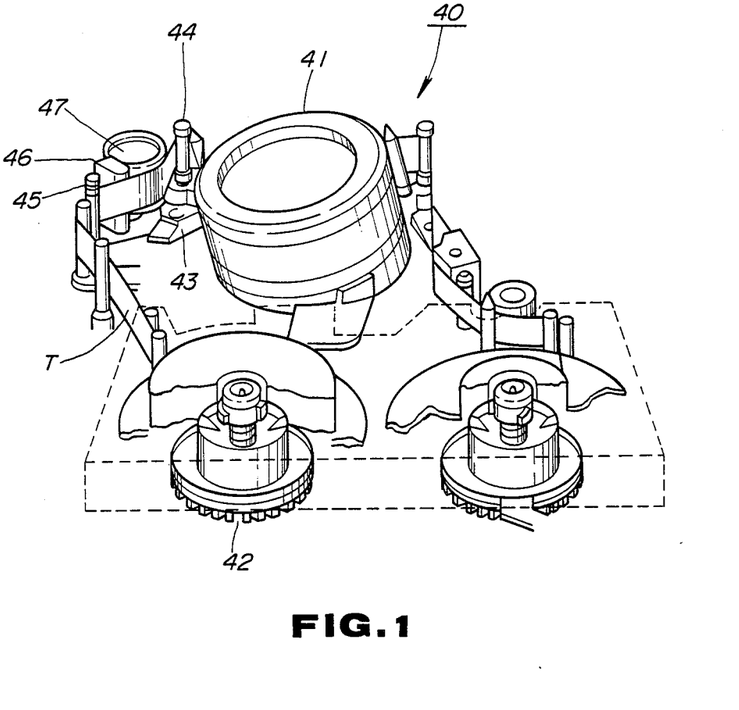
FIG. 1 is an explanatory illustration of a stabilizer mechanism.

FIG. 1 shows the stabilizer mechanism incorporated in a VTR 40 including a so-called M-type loading mechanism well known in the art.

When a magnetic tape cassette is loaded in the VTR 40, the loading mechanism comprising the guide post 44 fixed on a mounting member 43 and the guide post 45 provided in a tape driving system draws the magnetic tape T towards a rotary head drum 41, positioning the guide posts 44 and 45 with distance defined therebetween. A section of the tape T is wrapped helically on the drum 41. A full width erase head 46 for erasing signals recorded over the tape T is interposed between the guide posts 44 and 45. A cylindrical guide roller 47 having a relatively large diameter which functions as a stabilizer is installed near the erase head 46.

As noted previously, longitudinal vibration of the tape tends to be generated at the point where the erase head 46 and the guide post 45 contact the surface of the tape and this vibration is transmitted to the tape section on the drum 41, causing jitter. Through the rotatable engagement with the guide roller 47, the longitudinal vibration of the tape is transmitted to the guide roller. As a result, the vibration is damped, thereby controlling jitter and fluctuation of a picture to reduce color shade.

Figure 2:
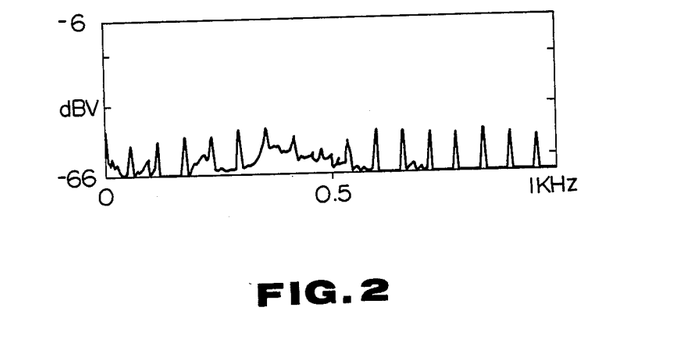
FIG. 2 is a graph showing frequency analysis of a coat-type magnetic tape such as metal tape recorded by a VTR having no stabilizer mechanism.
Figure 3:
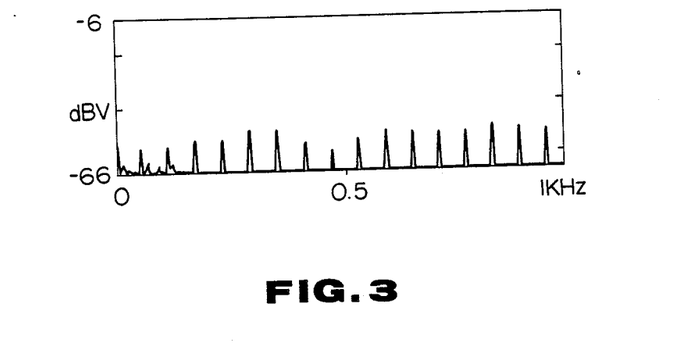
FIG. 3 is a graph showing frequency analysis of a coat-type magnetic tape such as metal tape recorded by a VTR including a stabilizer mechanism.

The effect of the inclusion of the guide roller as a stabilizer in a VTR provided with a U-type loading mechanism will be shown in FIGS. 2 and 3. In FIG. 2, the results of frequency analysis are shown. By means of a jitter meter the vibration of metal tape in a VTR without a tape stabilizer is obtained, wherein the horizontal axis indicates a frequency (kHz), and the vertical axis indicates an amplitude (dBv). FIG. 3 shows the results of frequency analysis, by means of a jitter meter, of the vibration of a metal tape in a VTR comprising a tape stabilizer, wherein, similarly to FIG. 2, the horizontal axis indicates a frequency (kHz), and the vertical axis indicates an amplitude (dBv).

It will be appreciated that the results show that fluctuation of a picture or jitter occurs within the range from 200 to 500 Hz when no stabilizer is provided, while when the stabilizer is provided, the results show that the jitter does not occur. In addition, it will be noted that providing the stabilizer in the vicinity of the rotary head drum is the most effective for damping the longitudinal vibration of the tape thereon.

Figure 4:
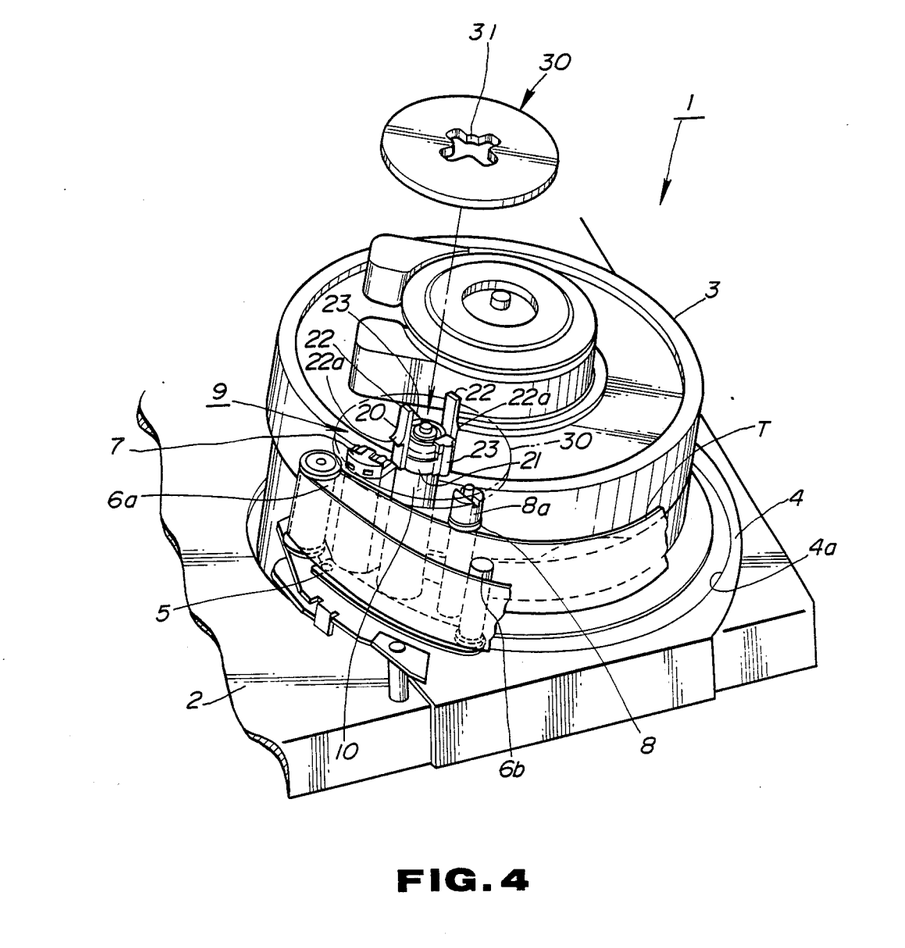
FIG. 4 is a perspective view of a preferred embodiment of a stabilizer.

Referring to FIG. 4, there is illustrated a preferred embodiment of the present invention. The depicted guide roller 10 functions as a stabilizer and is adapted for easy installation within a small space.

FIG. 4 shows a VTR provided with a so-called U-type loading mechanism, a rotary head drum 3 is installed on a chassis 2 which comprises a rotatable upper section and a stationary lower section. A plurality of magnetic heads (not shown) are provided on the peripheral surface between the upper and the lower sections. A guide rail 4 on which a guide groove 4a is formed at an upper end surface is arranged around the drum 3. A pair of base plates 5 are movably arranged to be guided via the groove 4a. The base plates 5 slidably move along the groove 4a by means of a driving mechanism (not shown) provided with a ring gear. A guide roller 6a is rotatably mounted on the end of the lower base plate 5, while a guide pole 6b is mounted at the opposite end from the roller 6a on the upper base plate 5.

A full width erase head 7 and a guide pole 8 are disposed in the vicinity of the guide roller 6a and the guide pole 6b located on the upper surface of guide rail 4 at a loading end position, that is, in front of the position where the tape T first contacts the periphery of the rotary head drum 3. The erase head 7 erases all signals recorded over the tape T before rerecording by means of the rotary head. The guide pole 8 includes a flange 8a on its upper end which functions as height adjusting means for restricting the height of tape T on the rotary head drum 3. Installed between the full erase head 7 and the guide pole 8 is a tape stabilizer 9. The tape stabilizer 9 is positioned a little after the erase head 7 in the tape path and contacts the surface of the tape T. The stabilizer 9 preferably tensions the tape T to a certain extent and restricts jitter or fluctuation of the VTR signal by damping longitudinal vibration of the tape immediately before the position where it contacts the periphery of the rotary head drum 3.

The tape stabilizer 9 comprises a guide roller 10, a holder 20, and a weight 30 and is rotatably supported on the guide rail 4. The guide roller 10 in cooperation with the guide pole 8 guides the tape T to the rotary head 3. The holder 20 is fixed at the upper end portion of the guide roller 10. The weight 30 is detachably supported by the holder 20. In this depicted arrangement, the holder 20 including the weight 30 is installed on the upper end of the flange 8a as a height adjusting means and thus this assembly can function as a stabilizer and height adjusting means. Alternatively, a flange may be provided on the guide roller 10 and the guide pole 8 may be omitted.

Figure 5:
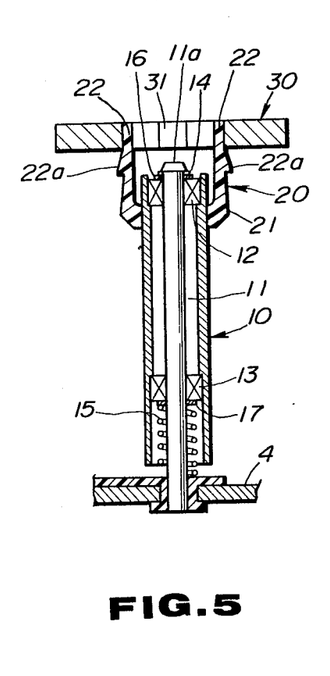
FIGS. 5 to 7 are vertical section views of a stabilizer shown in FIG. 4.
Figure 6:
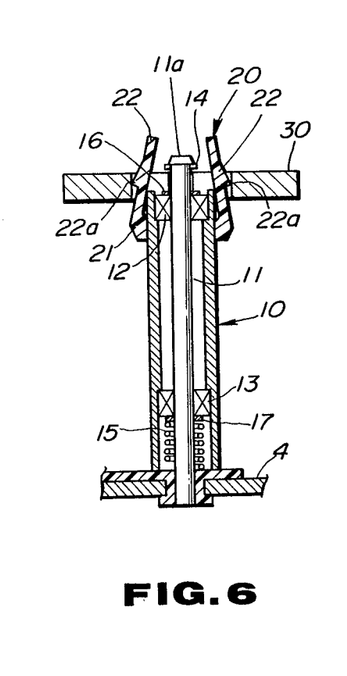
Figure 7:
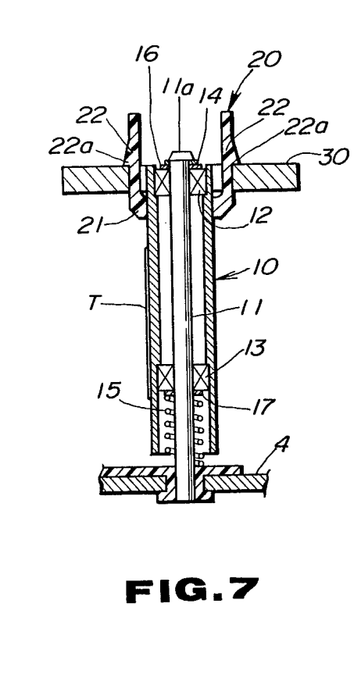

The tape stabilizer will now be explained in more detail with reference to FIGS. 4 to 8 hereinafter. In particular, FIGS. 5 to 7 show the procedure for installing the stabilizer on the holder 20.

The guide roller 10 is in the form of a hollow cylinder having a relatively smaller diameter. The roller 10 is rotatably supported by an axle 11 fixed on the guide rail 4 via radial roller bearings 12 and 13. The bearings 12 and 13 are supported on the upper and lower ends of the axle 11. Interposed between the lower side installed bearing 13 and the guide rail 4 is a coil spring 15 with a O-ring 17. The coil spring 15 urges the guide roller 10 upwardly so that the upper bearing 12 is urged against the bottom of the head 11a of the axle 11 via an O-ring 16 and a washer 14.

The holder 20 is made of an elastic synthetic resin and comprises a ring shaped engaging portion 21 for engaging the upper outer surface of the guide roller 10, a pair of barbed portions 22, and a pair of locating lugs 23. The locating lugs 23 are positioned at right angles with respect to the barbed portions 21 and extend upwardly a little from the engaging portion 21. The locating lugs 23 prevent the weight 30 from rotating relative to the holder 20. The weight 30 is in the form of a disc having a relatively large diameter with respect to that of the guide roller 10 and includes an engaging opening 31 at its center. The shape of opening 31 corresponds to that of the engaging portion 21 so that it may suitably receive and engage the pair of barbed portions 22 and the pair of locating lugs 23. The distance between the outer surfaces of the pair of engaging portions 21 becomes a little larger in the downward direction in order to prevent the weight 30 from sliding downwardly on the holder 20 and barbs 22a prevent the weight 30 from moving upwardly, once it is installed, thereby fixing the weight 30.

It will be appreciated that the weight 30 may be easily installed to and removed from the guide roller 10 by means of the holder 20.

Therefore, since the diameter of the guide roller 10 is relatively small so as to be adapted for location in a small space while the diameter of the weight 30 is relatively great, the above described stabilizer 9, according to the present invention, may be easily installed within a small space in the vicinity of the rotary head drum 3, in this case, the small space defined between the tape and the periphery of the head drum 3 so as to effectively damp longitudinal vibration of the magnetic tape T. It will be noted that for example, even when high grade mirror surfaced metal tape is used in a VTR comprising the stabilizer, the longitudinal vibration may easily be dampened, thereby preventing the jitter or a fluctuation of the signal from occuring when recording or reproducing.

The procedure for installing the stabilizer to the holder 20 will be described hereinbelow.

The weight 30 is fitted over the upper portion of the holder 20 with the locating lugs 23 and the barbed portions 22. The weight 30 is then pressed downwardly causing elastic inward deformation of the barbed portions 22 received in opening 31. At the same time, the guide roller 10 tends to be forced down to the surface of guide rail 4 against the biasing force of the coil spring 15 due to the thrusting force exerted on the weight 30. Thereafter, when the upper surface of weight 30 reaches the lower ends of barbs 22a, the barbed portions 22 expand outwardly so as to be returned to their initial state so that the weight 30 is fixed at a predetermined position. It will be appreciated that since the thrusting force of the weight 30 when fitting to the holder 20 is absorbed by the coil spring 15 and the lower edge of the guide roller 10, the weight 30 may be easily installed to the holder 20 without any damage to the roller bearings 12 and 13. Also, the weight 30 can easily be removed from the holder 20 by elastically deforming the barbed portions 22 inwardly a little so as to disengage the barbs 22a from the weight 30, thus facilitating the easy adjustment of the flange 8a, provided on the guide pole 8, which functions as a height adjusting means for adjusting the height of the tape.

Figure 8:
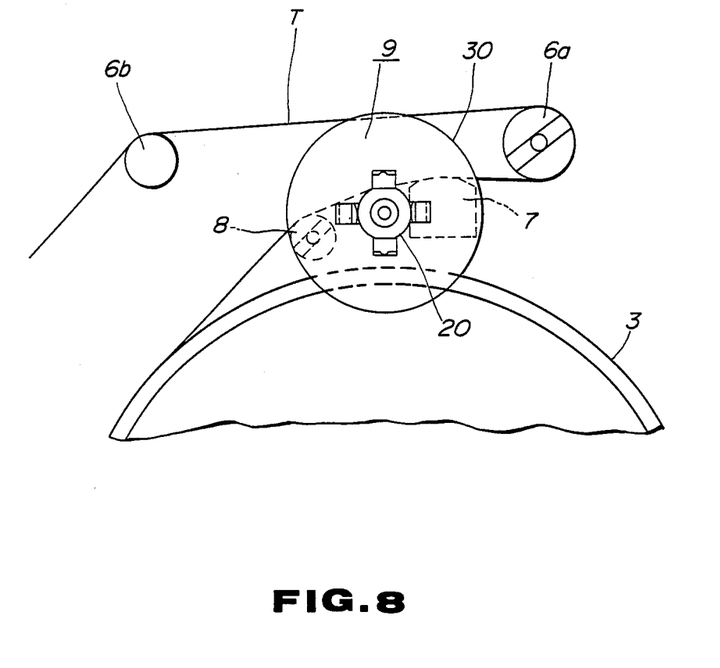
FIG. 8 is a schematic plan view of a stabilizer shown in FIG. 4.
Figure 9:
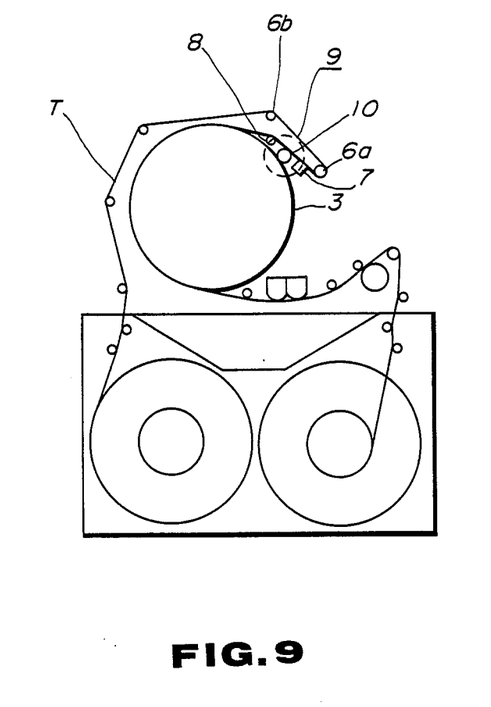
FIG. 9 is a schematic plan view of a stabilizer of an embodiment provided in a so-called U-type loading mechanism.

In the assembly operation of the VTR, the guide rollers, for example a guide roller 8 shown in FIG. 8, for the tape which are located within a small space around a rotary head drum must be adjusted precisely, therefore easy installation and removal of the weight is important in that it allows the adjustment of the guide rollers to be easily performed.

Although the present invention has been described in connection with the stabilizer provided for a so-called U-type loading mechanism, it will be noted that the stabilizer is also applicable in so-called M-type loading mechanisms. Moreover, a metal bearing or a resin bearing may be used for rotatably supporting the stabilizer instead of the radial roller bearing used in the above embodiment. Also, although the weight takes the form of a disc in the disclosed embodiment, it will be apparent that the shape of the weight may be selected freely according to needs.

Accordingly, it will to be understood that the invention is not limited to that specific embodiment, and that various changes and modifications may be effected therein by one skilled in the art without departing from the scope or the invention as defined in the appended claims.

What is claimed is:

1. A tape stabilizer unit for stabilizing a moving tape in a tape recording and/or reproducing apparatus comprising:
   a roller arranged so as to be in contact with a surface of the tape, said roller being rotatable by engagement with the moving tape;
   a circular weight having a diameter larger than that of said roller; and
   means for detachably connecting said weight to said roller so that rotation of said roller causes rotation of said weight.

2. A tape stabilizer unit as set forth in claim 1, wherein said means for detachably connecting includes a fastener made of an elastic material and engageable with said weight and said roller.

3. A tape stabilizer unit as set forth in claim 2, wherein said weight is formed with a central opening for receiving and tightly engaging said fastener.

4. A tape stabilizer unit as set forth in claim 3, further comprising an axle concentric with said roller for rotatably supporting said roller.

5. A tape stabilizer unit as set forth in claim 4, wherein said axle has at least one roller bearing for rotatably supporting said roller.

6. A tape stabilizer unit as set forth in claim 5, further comprising a mechanical chassis provided in the recording and/or reproducing apparatus and a spring interposed between the end of said roller and said mechanical chassis.

7. A stabilizer unit, for damping vibration of a magnetic tape, provided in a tape recording and/or reproducing apparatus including a magnetic head, said stabilizer unit comprising:
   a roller mechanism adapted to be disposed within a small space in the vicinity of the magnetic tape, said mechanism including a roller arranged so as to be in contact with the surface of the magnetic tape; and
   a detachable weight provided on said roller;
   said roller and said weight being adapted for simultaneous rotation in response to longitudinal movement of the magnetic tape, thereby damping vibration of the tape.

8. A stabilizer unit as set forth in claim 7, wherein said roller mechanism further includes an axle concentric therewith for detachably supporting said roller.

9. A stabilizer unit as set forth in claim 7, wherein said roller mechanism further comprises height adjusting means for engaging and restricting a height of the magnetic tape during recording and/or reproducing.

10. A stabilizer unit as set forth in claim 7, wherein said weight is circular and the diameter of said roller is smaller than that of said weight.

11. A stabilizer unit as set forth in claim 7, further comprising a holder, provided at one end of said roller, for receiving and detachably engaging said weight.

12. A stabilizer unit as set forth in claim 11, wherein said holder further comprises a barbed portion for establishing firm engagement with said weight and a locating portion for fixing said weight so as to present said weight from rotating with respect to said roller.

13. A stabilizer unit as set forth in claim 12, wherein said holder is made of an elastically deformable material.

14. A stabilizer unit as set forth in claim 3, wherein elastic deformation of said barbed portion in response to a pull on said weight allows the weight to be removed.

15. A stabilizer unit as set forth in claim 11, further comprising a mechanical chassis provided in the recording and/or reproducing apparatus and a spring interposed between and engaging the chassis and one end of said roller so as to urge said roller in a direction away from the chassis.

16. A stabilizer unit as set forth in claim 12, wherein said weight is formed with an opening that corresponds to said barbed portion and said locating portion.

17. A stabilizer unit as set forth in claim 16, wherein said weight is in the form of an annular disc.

18. A stabilizer unit, for damping longitudinal vibration of a magnetic tape, provided on a mechanical chassis in a recording and/or reproducing apparatus including a magnetic rotary head drum, said stabilizer unit comprising:
   a roller adapted to be located in a small space defined between the magnetic tape and the rotary head drum, said roller being held in contact with the surface of the running magnetic tape and rotated thereby; and
   detachable means rotating with said roller for adding a predetermined mass to said roller.

19. A stabilizer unit as set forth in claim 18, wherein said detachable means is a plate greater in size than said roller.

20. A stabilizer unit as set forth in claim 18, further comprising an axle, fixed on the mechanical chassis concentrically with said roller, for rotatably supporting said roller.

21. A stabilizer unit as set forth in claim 20, wherein said axle has a flange portion at an end thereof opposite the chassis, said axle supporting said roller between the chassis and said flange portion.

22. A stabilizer unit as set forth in claim 21, wherein said axle further comprises a coil spring through which said axle is inserted, said spring being positioned between and engageable with the mechanical chassis and one end of said roller so as to urge said roller against said flange.

23. A stabilizer unit as set forth in claim 22, wherein said roller further comprises a holder for detachably receiving and holding said weight.

24. A stabilizer unit as set forth in claim 21, wherein said axle further comprises a bearing means for engaging and rotatably supporting said roller.

25. A stabilizer unit, for damping vibration of a magnetic tape, installed on a mechanical chassis on which a magnetic rotary head and guide posts including a height adjusting means for restricting the height of tape are arranged in a recording and/or reproducing apparatus including a magnetic head, said stabilizer unit comprising:
   a roller provided in the vicinity of the rotary head drum, said roller being arranged so as to be in contact with the surface of the magnetic tape and rotating so as to follow the tape travel motion; and
   a detachable weight provided on and rotating with said roller,
   wherein the vibration of the tape is transmitted to said weight via said roller so as to be damped.

26. A stabilizer unit as set forth in claim 25, wherein said weight is detachably mountable on an end portion of said roller opposite from the chassis.

27. A stabilizer unit as set forth in claim 26, wherein one of said guide posts is positioned in the vicinity of the rotary head drum and said weight is positioned over said one of said guide posts.

28. An apparatus for recording and/or reproducing signals on a magnetic tape wound on supply and take-up reels housed in a cassette, said apparatus comprising:
   a mechanical chassis;
   a magnetic head assembly, installed on said mechanical chassis, operative to magnetically record or reproduce signals on the tape;
   a loading mechanism, including a plurality of tape guide posts, for disposing the tape in a predetermined path leading out of the cassette, one of said guide posts being rotatably disposed in the vicinity of said magnetic head assembly;
   a driving mechanism for driving the tape from said supply reel to said take-up reel via said magnetic head assembly; and
   a weight detachably provided on and rotatable with said one of said guide posts.

* * * * *